United States Patent
Sternberger

(10) Patent No.: US 8,201,390 B2
(45) Date of Patent: Jun. 19, 2012

(54) PARTIAL CASCADE THRUST REVERSER

(75) Inventor: Joe E Sternberger, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 1098 days.

(21) Appl. No.: 11/955,041

(22) Filed: Dec. 12, 2007

(65) Prior Publication Data
US 2009/0151320 A1 Jun. 18, 2009

(51) Int. Cl.
F02K 3/02 (2006.01)
F02K 1/54 (2006.01)
B05B 12/00 (2006.01)

(52) U.S. Cl. ............... 60/226.2; 244/110 B; 239/265.33

(58) Field of Classification Search .................. 60/226.2, 60/230; 244/110 B
See application file for complete search history.

(56) References Cited

U.S. PATENT DOCUMENTS

| | | | |
|---|---|---|---|
| 3,500,645 A | 3/1970 | Hom | |
| 4,026,105 A | 5/1977 | James | |
| 4,030,290 A | 6/1977 | Stachowiak | |
| 4,073,440 A | 2/1978 | Hapke | |
| 4,183,478 A | 1/1980 | Rudolph | |
| 4,596,621 A | 6/1986 | Nawaz | |
| 4,722,821 A | 2/1988 | Vermilye | |
| 4,852,805 A | 8/1989 | Vermilye | |
| 4,922,711 A | 5/1990 | Brown | |
| 5,097,662 A | 3/1992 | Vieth | |
| 5,142,862 A | 9/1992 | Brown | |
| 5,243,817 A * | 9/1993 | Matthias | 60/226.2 |
| 5,309,711 A | 5/1994 | Matthias | |
| 5,448,884 A * | 9/1995 | Repp | 60/223 |
| 5,507,143 A | 4/1996 | Luttgeharm et al. | |
| 5,575,147 A | 11/1996 | Nikkanen | |
| 5,706,649 A | 1/1998 | Robinson et al. | |
| 5,794,434 A | 8/1998 | Szupkay | |
| 5,806,302 A * | 9/1998 | Cariola et al. | 60/204 |
| 5,904,320 A | 5/1999 | Tindell | |
| 5,915,765 A | 6/1999 | Sternberger | |
| 6,000,216 A | 12/1999 | Vauchel | |
| 6,042,053 A | 3/2000 | Sternberger et al. | |
| 6,151,883 A | 11/2000 | Hatrick et al. | |
| 6,170,254 B1 | 1/2001 | Cariola | |
| 6,286,784 B1 | 9/2001 | Hardy et al. | |
| 6,474,059 B2 * | 11/2002 | Stretton | 60/226.2 |
| 6,546,715 B1 | 4/2003 | Blevins et al. | |
| 6,554,224 B2 | 4/2003 | Sternberger | |
| 6,557,799 B1 | 5/2003 | Sternberger | |
| 6,604,355 B1 | 8/2003 | Sternberger | |
| 6,622,474 B1 | 9/2003 | Sternberger et al. | |

(Continued)

Primary Examiner — Ehud Gartenberg
Assistant Examiner — Arun Goyal
(74) Attorney, Agent, or Firm — Hovey Williams LLP

(57) ABSTRACT

A thrust reverser for a jet engine comprises a translating wall section moveable between a stowed position and a deployed position. The translating wall section is adjacent an annular fan duct wall or other fixed portion of the jet engine when in the stowed position and is separated from the annular fan duct wall when in the deployed position, thereby creating an aperture through which a fluid stream passes. A fluid flow reverser element directs the fluid stream in a direction generally forward relative to the jet engine when the translating wall section is in the deployed position. The fluid flow reverser element extends only partially into the fluid stream such that only a first portion of fluid of the fluid stream engages the fluid flow reverser element. A second portion of the fluid stream is entrained in the first portion and is thereby directed forward relative to the jet engine.

20 Claims, 4 Drawing Sheets

U.S. PATENT DOCUMENTS

| | | |
|---|---|---|
| 6,625,972 B1 | 9/2003 | Sternberger |
| 6,764,045 B2 | 7/2004 | Sternberger |
| 6,824,101 B2 | 11/2004 | Sternberger et al. |
| 6,895,742 B2 * | 5/2005 | Lair et al. .................... 60/226.2 |
| 7,007,454 B2 | 3/2006 | Dehu et al. |
| 7,124,981 B2 * | 10/2006 | Parham .................... 244/110 B |
| 2006/0277895 A1 | 12/2006 | Thornock et al. |
| 2007/0084964 A1 | 4/2007 | Sternberger |
| 2009/0107108 A1 * | 4/2009 | Vauchel et al. ............. 60/226.2 |
| 2010/0001123 A1 * | 1/2010 | Hillereau et al. ............... 244/54 |

* cited by examiner

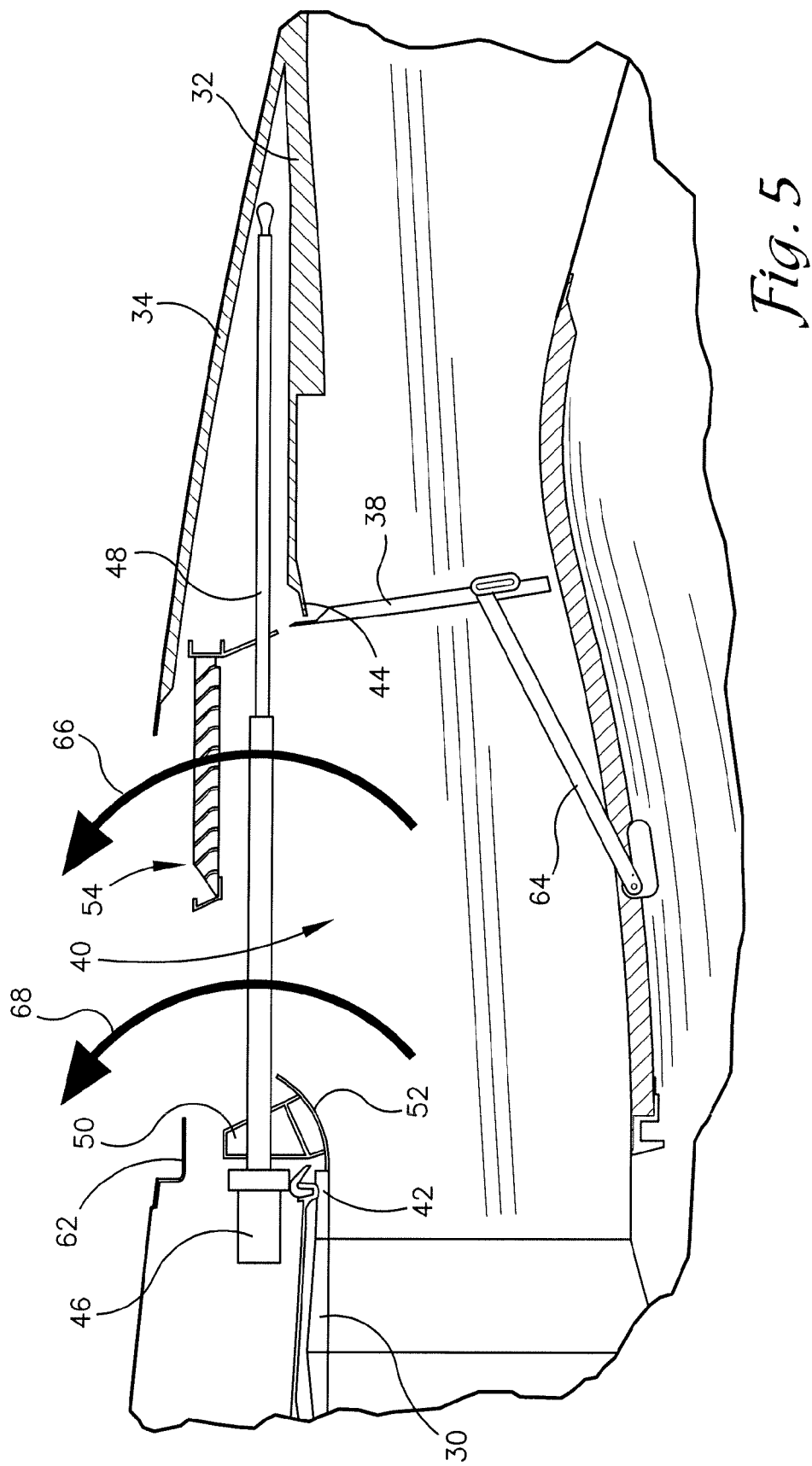

PARTIAL CASCADE THRUST REVERSER

BACKGROUND

1. Field

The present technology relates to thrust reversers for jet engines. More particularly, embodiments of the technology involve a thrust reverser with a reduced-profile cascade element.

2. Related Art

Airplanes powered by jet engines have high landing speeds, which can place a heavy burden on the planes' wheel brakes and tires during landing runs. To reduce this burden, most jet-driven airplanes are provided with means to reverse the direction of flow of the jet stream during landing runs to produce a reverse thrust, thus slowing the airplane with the jet engines as opposed to the wheel brakes.

Many different types of thrust reversers have been developed for this purpose, all based on the principle of blocking rearward flow of the jet stream and diverting the jet stream flow laterally, forwardly, or both. One type of thrust reverser, called the cascade type, uses a cascade element comprising an array of stacked or "cascading" arcuate vanes to direct fluid flow forwardly of the engine. During normal operation of the engine, the cascade element is covered to prevent air from passing through the thrust reverser. The cascade element is uncovered during thrust reversing operations and a fluid stream is directed through the cascade element, thereby producing reverse thrust.

It may be desirable to reduce the size or weight of the thrust reverser where, for example, the overall size or weight of the jet engine is to be reduced. Unfortunately, reducing the size of the thrust reverser is challenging because the thrust reverser needs to be sufficiently large and durable to handle the fluid stream of the jet engine. Thus, there is a need for an improved thrust reverser that does not suffer from the limitations of the prior art.

SUMMARY

The present teachings provide an improved thrust reverser that represents a distinct advance in the state of the art. Particularly, embodiments of the present technology provide a thrust reverser that includes a reduced-profile cascade element that reduces the size and weight of the thrust reverser.

The thrust reverser includes a translating wall section and a fluid flow reverser element. The translating wall section is moveable between a first wall position and a second wall position, and is adjacent a fixed portion of the jet engine when in the first wall position. At least a portion of the translating wall section is separated from the fixed portion of the jet engine by a space when the translating wall section is in the second wall position, thereby creating an aperture between the fixed portion of the jet engine and the translating wall section.

The fluid flow reverser element directs a fluid flow in a direction generally forward relative to the jet engine when the translating wall section is in the second position. The fluid flow reverser element extends only partially into a fluid stream passing through the aperture such that only a portion of fluid of the fluid stream engages the fluid flow reverser element. Some or all of the remaining fluid of the fluid stream is entrained in the portion of the fluid stream that engages the fluid flow reverser element, thereby causing the remaining fluid to flow in a direction generally forward relative to the jet engine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Preferred implementations of the present technology are described in detail below with reference to the attached drawing figures, wherein:

FIG. 5 is a cross sectional view of a portion of the jet engine of FIG. 2, illustrating the thrust reverser in a fully deployed position.

DETAILED DESCRIPTION

The following detailed description of the present technology references the accompanying drawings that illustrated specific embodiments in which the technology can be practiced. The embodiments are intended to describe aspects of the technology in sufficient detail to enable those skilled in the art to practice the technology. Other embodiments can be utilized and changes can be made without departing from the scope of the present teachings. The following detailed description is, therefore, not to be taken in a limiting sense. The scope of the present invention is defined only by the appended claims, along with the full scope of equivalents to which such claims are entitled.

Figure 1:
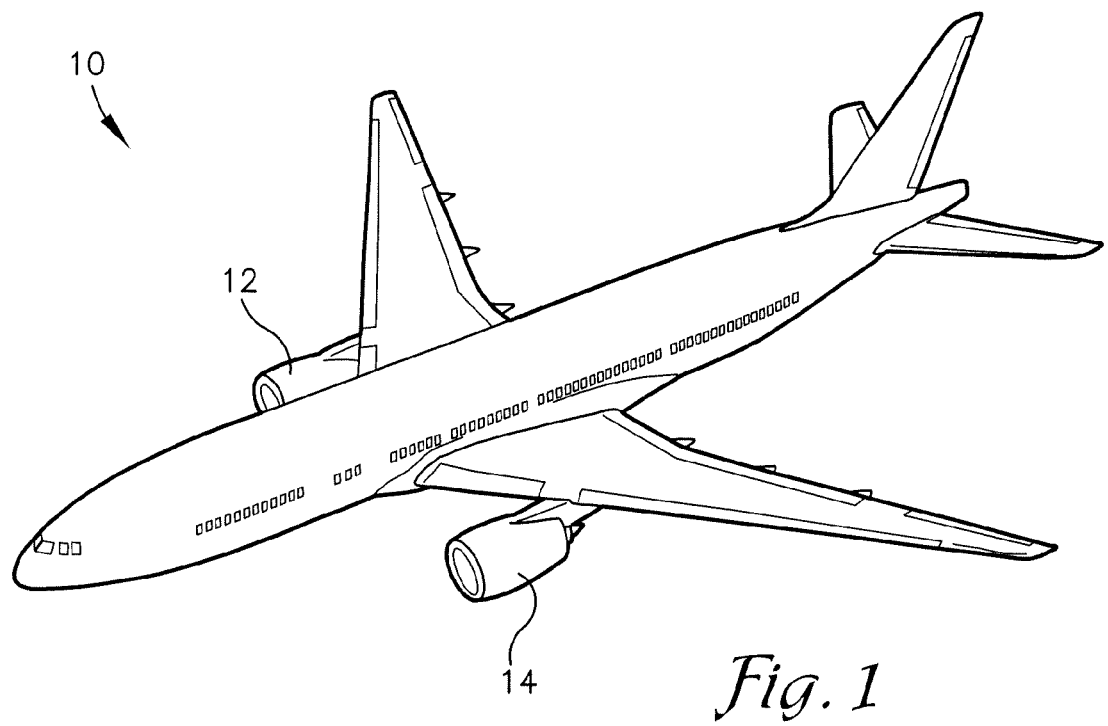
FIG. 1 is a perspective view of a jet aircraft with a plurality of jet engines incorporating principles of the present technology.
Figure 2:
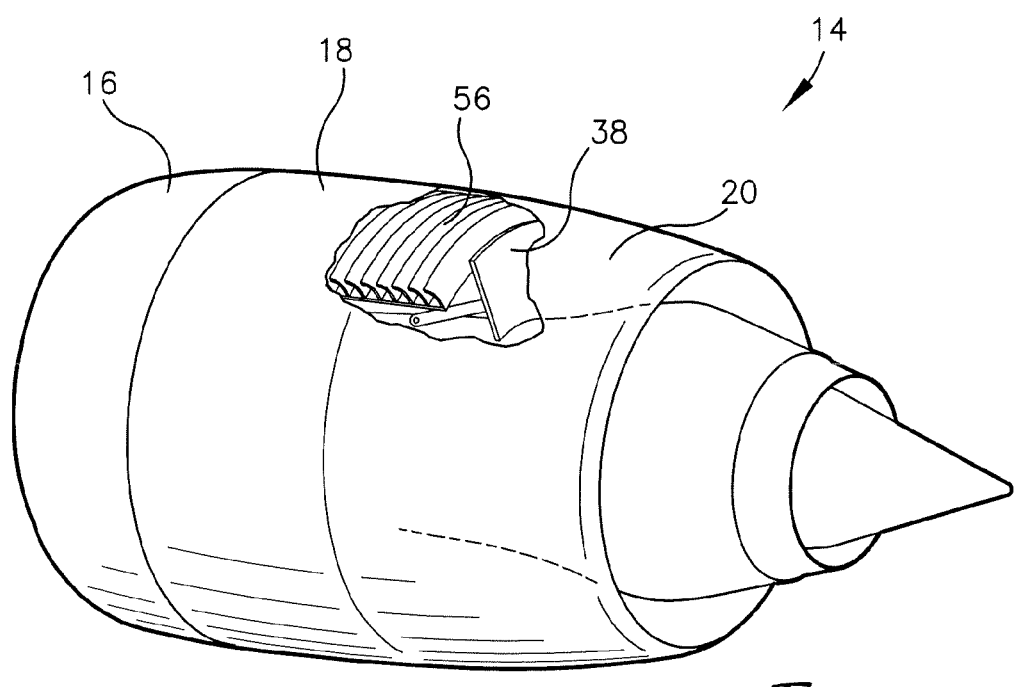
FIG. 2 is a perspective view of one of the jet engines of the aircraft of FIG. 1, including a cut-away section exposing various internal components of a thrust reverser constructed according to principles of the present technology.

An aircraft 10 having a plurality of jet engines 12,14 incorporating principles of the present technology is illustrated in FIG. 1. The aircraft 10 may be a relatively large aircraft intended for commercial or military use, or may be a relatively small aircraft intended for private or corporate use. The jet engines 12,14 may be attached to wings of the aircraft 10, as illustrated, or may be attached to another portion of the aircraft, such as a tail or fuselage of the aircraft 10.

Referring also to FIGS. 2-5, each of the jet engines 12,14 includes an inlet cowling 16, a fixed fan cowling 18, a thrust reverser 20, a fan duct inner wall 22, an aft cowl 24, a fan duct 26, and a fan duct outer wall 30.

The thrust reverser 20 includes a translating wall section 32 and a translating cowling 34 that together form a translating sleeve. The translating wall section 32 partially or entirely circumscribes the fan duct 26 and moves between a stowed position (FIG. 3) and a deployed position (FIG. 5). The translating wall section 32 includes a forward recess 36 for receiving a blocker door 38 when in the stowed position, as explained below in greater detail. When the thrust reverser 20 is in the stowed position, the translating wall section 32, the fan duct outer wall 30, and blocker door 38 present a substantially continuous surface of the fan duct 26, directing a fluid stream through the fan duct 26 such that the fluid stream exits an aft portion of the jet engine 14, thereby producing forward thrust.

When the thrust reverser 20 is in the deployed position, the translating wall section 32 is separated from the fan duct outer wall 30 leaving an aperture 40 (FIGS. 4, 5) between the translating wall section 32 and a fixed portion of the jet engine, such as the fan duct outer wall 30, for the fluid stream to pass through. The aperture 40 generally extends from an aft edge 42 of the fan duct outer wall 30 to a forward edge 44 of the translating wall section 32.

The translating cowling 34 provides an outer circumferential surface of the jet engine 14. When the thrust reverser 20 is in the stowed position, the translating cowling 34 is substantially adjacent the fixed fan cowling 18 or other fan casing element such that the fixed fan cowling 18 and the translating cowling 34 present a substantially continuous outer surface of the jet engine 14. As explained above, the translating cowling 34 is integral with or attached to the translating wall section 32 such that the two form a single sleeve structure.

An actuator 46 and actuator arm 48 move the thrust reverser 20 between the stowed position and the deployed position in response to a signal received from, for example, an aircraft control system. The actuator 46 is placed generally forward of the translating wall section 32 and the translating cowling 34 when the thrust reverser 20 is in the stowed position. The actuator 46 may be attached to, for example, the fan duct outer wall 30 or other fixed component of the engine 14. The form and function of the actuator 46 may be substantially conventional. The actuator 46 may be, for example, hydraulically or electrically powered. The actuator arm 48 is supported at least in party by a torque box 50. A bullnose 52 is part of, or proximate to, the torque box 50.

A fluid flow reverser assembly 54 operates to direct fluid flow in a direction generally forwardly relative to the jet engine 10 when the thrust reverser 20 is in the deployed position. The fluid flow reverser assembly 54 includes a cascade element 56 comprising an array of arcuate vanes, arranged in a stacked or "cascading" fashion. The vanes of the cascade element 56 direct air, exhaust gases, or other fluids passing therethrough forwardly relative to the jet engine 10. A single cascade element 56 may substantially entirely encircle the fan duct 26 or, alternatively, a plurality of cascade elements 56 may be used, with each element partially encircling the fan duct 26.

Fluid flow is in a direction generally forward relative to the jet engine 10 if the fluid flows in a direction that represents a forward rake relative to the jet engine 10 of at least one degree. In other words, if a first axis corresponds to a longitudinal axis of the jet engine 10, and a second axis is perpendicular to the first axis, fluid flow is in a direction generally forward relative to the jet engine 10 if the fluid flows in a direction that is angled forwardly of the second axis relative to the jet engine 10.

A forward support element 58 is connected to a forward portion of the cascade element 56 and an aft support element 60 is connected to an aft portion of the cascade element 56. The forward support element 58 and the aft support element 60 may partially or entirely circumscribe the fan duct to support and/or interconnect the one or more cascade elements 56. The aft support element 60 may interconnect various cascade elements 56 and connect the cascade elements 56 to the translating wall section 32, to the translating cowling 34, or both. The forward support element 58 may simply interconnect the cascade elements 56, wherein the assembly 54 is supported entirely by the aft support element 60.

Figure 3:
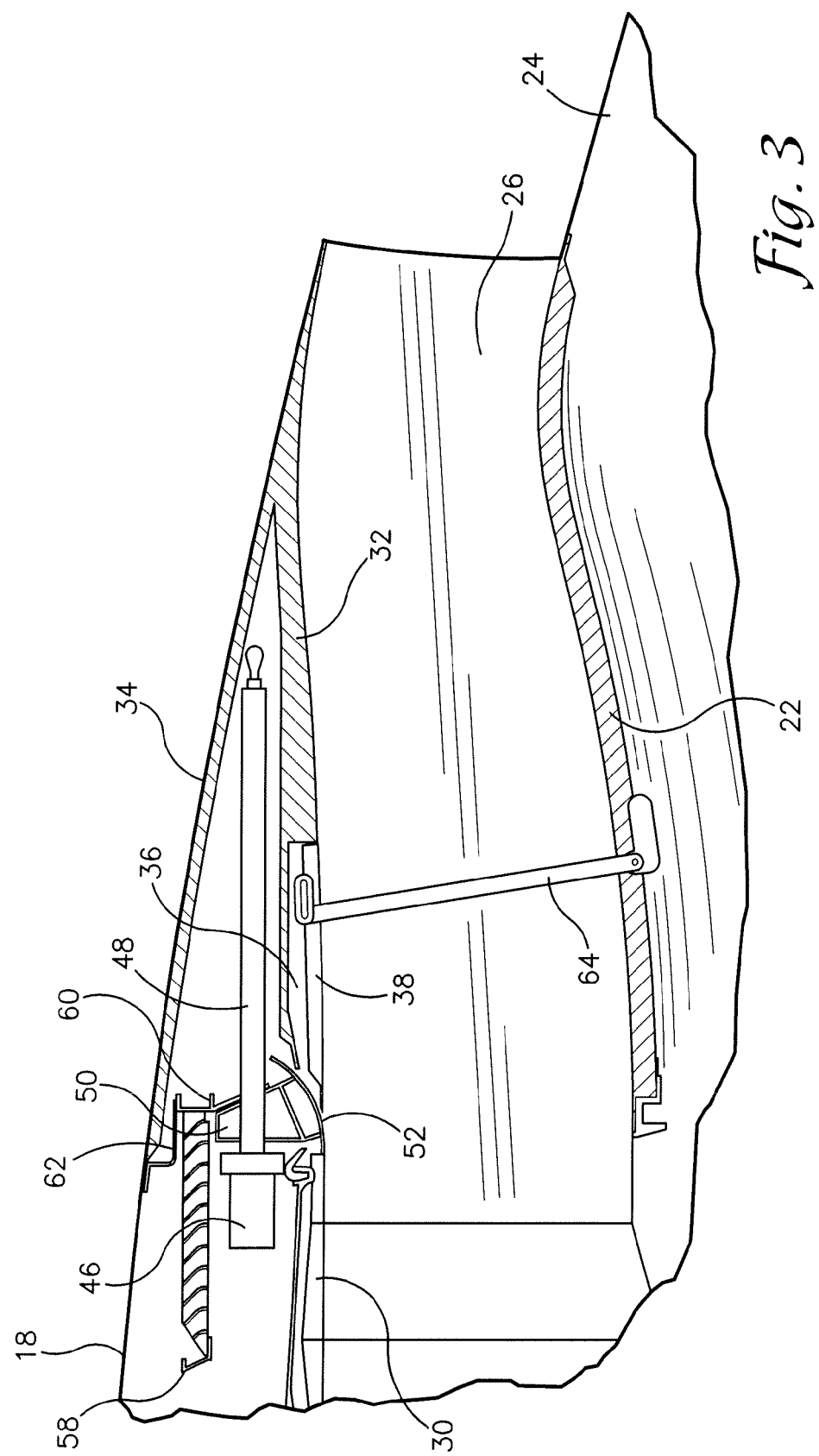
FIG. 3 is a cross sectional view of a portion of the jet engine of FIG. 2, illustrating the thrust reverser in a stowed position.

Each support element 58,60 may be, for example, substantially continuous and ring-shaped. Furthermore, each of the forward support element 58 and the aft support element 60 may engage a fixed structural component of the jet engine 10 when the thrust reverser 20 is in the stowed and/or deployed position. As illustrated in FIG. 3, for example, the aft support element 60 may engage a cowl support flange 62 and the torque box 50 when the thrust reverser 20 is in the stowed position.

A blocker door drag link 64 is pivotally connected to the fan duct inner wall 22 and causes the blocker door 38 to move from a position nested within the forward recess 36 of the translating wall section 32 when the thrust reverser 20 is in the stowed position as illustrated in FIG. 3, to a position interposed in the fan duct 26 and substantially blocking fluid passage through the fan duct 26 when the thrust reverser 20 is in the deployed position.

Figure 4:
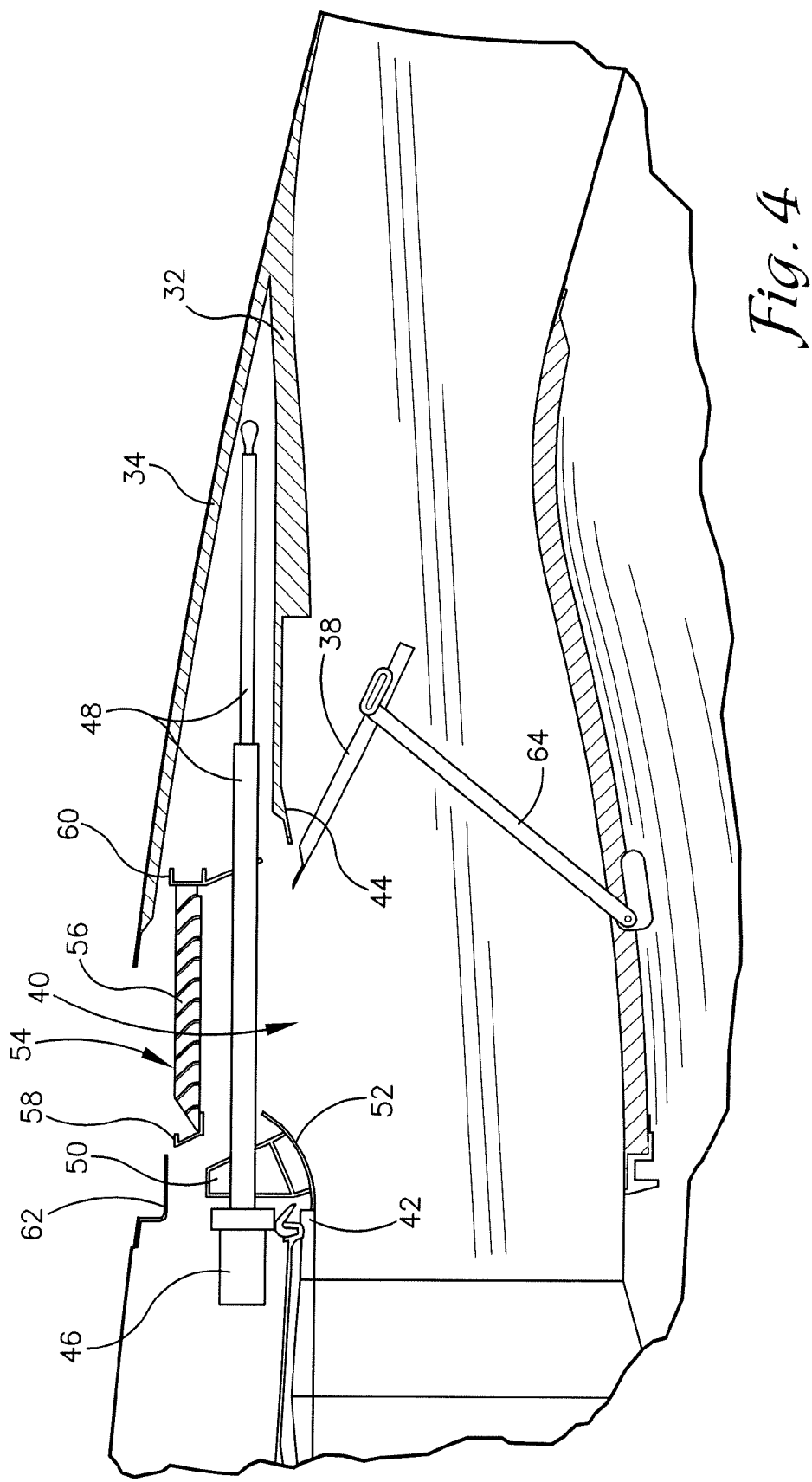
FIG. 4 is a cross sectional view of a portion of the jet engine of FIG. 2, illustrating the thrust reverser in a partially deployed position.

During normal operation of the jet engine 10 the thrust reverser 20 remains in the stowed position, thereby allowing air to flow through the fan duct 26 and provide forward thrust to the engine 14. When it becomes necessary to decelerate the aircraft 10, such as during landing, the thrust reverser 20 is moved from the stowed position, illustrated in FIG. 3, to the deployed position, illustrated in FIG. 5. An intermediate position is illustrated in FIG. 4.

When the thrust reverser 20 is in the deployed position, the blocker door 38 prevents the fluid stream from passing through the fan duct 26, thereby directing the fluid stream through the aperture 40. As illustrated in FIG. 5, the cascade element 56 extends only partially into the fluid stream passing through the aperture 40. A first portion 66 of the fluid stream passing through the aperture 40 engages the cascade element 56 and is directed forwardly relative to the engine 10. A second portion 68 of the fluid stream passing through the aperture 40 does not engage the cascade 56, but is entrained within the first portion 66 of the fluid stream, causing the second portion 68 of the fluid stream to follow a path that is generally forward relative to the engine 10. Thus, a length of the cascade element 56 from the forward support element 42 to the aft support element 44 is less than a length of the aperture 40 from the aft edge of the fan duct outer wall 42 to the forward edge of the translating wall section 44.

The length of the cascade element 56 may be within the range of from about ⅛ to about ⅞ of the length of the aperture 40; may be within the range of from about ¼ to about ¾ of the length of the aperture 40; may be within the range of from about ⅜ to about ⅝ of the length of the aperture 40; or may be about ½ of the length of the aperture 40. Similarly, a portion of the fluid stream engaging the cascade element 56 may be within the range of from about ⅛ to about ⅞; may be within the range of from about ¼ to about ¾; may be within the range of from about ⅜ to about ⅝; or may be about ½.

The actual length of the cascade element 56 may be within the range of from about 1.0 cm to about 1.0 m; within the range of from about 5.0 cm to about 90.0 cm; within the range of from about 10.0 cm to about 80.0 cm; or may be about 30.0 cm. Because the cascade 56 does not need to span the entire length of the aperture 40, the cascade 56 and related elements may be constructed according to a reduced size and weight, decreasing the overall size, weight, and cost of the engine 14.

Although the present technology has been described with reference to the preferred embodiments illustrated in the attached drawings, it is noted that equivalents may be employed and substitutions made herein without departing from the scope of the subject matter recited in the claims. It will be appreciated, for example, that the translating wall section 32 may be partially or entirely omitted, and may or

Having thus described preferred implementations of the present technology, what is claimed as new and desired to be protected by Letters Patent includes the following:

Having thus described preferred implementations of the present technology, what is claimed as new and desired to be protected by Letters Patent includes the following:

1. A thrust reverser for a jet engine, said thrust reverser comprising:
   a translating wall section moveable between a first position and a second position, said translating wall section being adjacent a fixed portion of said jet engine when in said first position, at least a portion of said translating wall section being separated from said fixed portion of said jet engine by a space when said translating wall section is in said second position thereby creating an aperture between said fixed portion of said jet engine and said translating wall section, wherein the aperture is bounded by a forward edge defined by said fixed portion and an aft edge defined by said translating wall section; and
   a fluid flow reverser element having a forward edge and an aft edge fixed relative to the translating wall section and configured for directing a fluid flow in a direction generally forward relative to said jet engine when said translating wall section is in said second position, said fluid flow reverser element extending only partially into a fluid stream passing through said aperture such that a first portion of fluid of said fluid stream engages said fluid flow reverser element and a second portion of fluid of said fluid stream does not engage the fluid flow reverser element and is entrained within the first portion of the fluid stream,
   wherein a first distance between said forward edge and said aft edge of said fluid flow reverser element is less than a second distance between said forward edge and said aft edge of said aperture.

2. The thrust reverser as set forth in claim 1, further comprising a support element securing a first end of said fluid flow reverser element, said fluid flow reverser element being supported on said jet engine solely by said support element when said translating wall section is in said second position.

3. The thrust reverser as set forth in claim 2, further comprising an actuator for driving said support element to move said translating wall section from said first position to said second position.

4. The thrust reverser as set forth in claim 1, wherein said first portion of fluid of said fluid stream engaging said fluid flow reverser element is within the range of from 1/8 to 7/8.

5. The thrust reverser as set forth in claim 1, wherein said first portion of fluid of said fluid stream engaging said fluid flow reverser element is within the range of from 3/8 to 5/8.

6. The thrust reverser as set forth in claim 1, wherein said fluid flow reverser element extends into an aft portion of said fluid stream.

7. The thrust reverser as set forth in claim 1, said fluid flow reverser element comprising an array of arcuate vanes.

8. The thrust reverser as set forth in claim 1, the aperture and the fluid flow reverser element each substantially circumscribing the jet engine.

9. The thrust reverser as set forth in claim 1, wherein a ratio of said first distance between said forward edge and said aft edge of said fluid flow reverser element to said second distance between said forward edge and said aft edge of said aperture is within the range of from 1/8 to 7/8.

10. The thrust reverser as set forth in claim 9, wherein a ratio of said first distance between said forward edge and said aft edge of said fluid flow reverser element to said second distance between said forward edge and said aft edge of said aperture is within the range of from 3/8 to 5/8.

11. A thrust reverser for a jet engine, said jet engine including an annular casing circumscribing a fluid flow duct, said thrust reverser comprising:
    a translating wall section moveable between a first wall position and a second wall position, said translating wall section being adjacent said annular casing when in said first wall position, at least a portion of said translating wall section being separated from said annular casing by a space when said wall section is in said second wall position thereby creating an aperture between said annular casing and said translating wall section, said aperture bounded by a forward aperture edge defined by said annular casing and an aft aperture edge defined by said translating wall section;
    a cascading flow reverser supported by said translating wall section for directing a fluid flow in a direction generally forward relative to said jet engine when in said second wall position, said reverser extending only partially into a path of a fluid flowing through said aperture such that a first portion of said fluid flowing through said aperture engages said reverser and a second portion of said fluid flowing through said aperture does not engage the reverser and is entrained within the first portion of the fluid flowing through said aperture, said cascading flow reverser including a forward reverser edge and an aft reverser edge, wherein a first distance between said forward reverser edge and said aft reverser edge is less than a second distance between said forward aperture edge and said aft aperture edge, wherein when the translating wall section is in the second wall position, the portion of the aperture between the annular casing and the forward edge of the cascading flow reverser does not have any other structural components impeding the fluid stream; and
    a blocker door operably connected to said translating wall section such that when said translating wall section moves from said first wall position to said second wall position, said blocker door moves from a first door position to a second door position, said second door position being interposed in said fluid flow duct.

12. The thrust reverser as set forth in claim 11, further comprising a support element securing a first end of said cascading flow reverser, said cascading flow reverser being supported on said jet engine solely by said support element when said translating wall section is in said second wall position.

13. The thrust reverser as set forth in claim 12, further comprising an actuator for driving said support element to move said translating wall section from said first wall position to said second wall position.

14. The thrust reverser as set forth in claim 11, wherein a ratio of said first distance between said forward reverser edge and said aft reverser edge of said cascading flow reverser to said second distance between said forward aperture edge and said aft aperture edge of said aperture is within the range of from 1/8 to 7/8.

15. The thrust reverser as set forth in claim 11, wherein a ratio of said first distance between said forward reverser edge and said aft reverser edge of said cascading flow reverser to said second distance between said forward aperture edge and said aft aperture edge of said aperture is within the range of from 3/8 to 5/8.

16. A thrust reverser for a jet engine, said jet engine including an annular fan casing circumscribing a fluid flow duct, said thrust reverser comprising:
- a sleeve including—
  - a translating wall section, and
  - a translating cowling,
  - said sleeve moveable between a first sleeve position and a second sleeve position, said sleeve being adjacent said annular fan casing when in said first sleeve position, at least a portion of said sleeve being separated from said annular fan casing by a space when said sleeve is in said second sleeve position thereby creating an aperture between said annular fan casing and said translating sleeve, said aperture providing a fluid flow path from said fluid flow duct to an outside of said jet engine, said aperture bounded by a forward aperture edge defined by said annular fan casing and an aft aperture edge defined by said sleeve;
- a cascading fluid flow reverser supported by said sleeve for directing a fluid flow in a direction generally forward relative to said jet engine when in said second sleeve position, said reverser extending only partially into said fluid flow path such that a first portion of a fluid flowing through said aperture engages said reverser and a second portion of said fluid flowing through said aperture does not engage the reverser and is entrained within the first portion of the fluid flowing through said aperture, and said reverser including a forward reverser edge and an aft reverser edge, wherein a first distance between said forward reverser edge and said aft reverser edge is less than a second distance between said forward aperture edge and said aft aperture edge wherein when the sleeve is in the second sleeve position, the portion of the aperture between the annular fan casing and the forward edge of the cascading fluid flow reverser does not have any other structural components impeding the fluid stream; and
- a blocker door operably connected to the sleeve such that when said sleeve moves from said first sleeve position to said second sleeve position, said blocker door moves from a first door position to a second door position, said second door position being interposed in said fluid flow duct.

17. The thrust reverser as set forth in claim 16, wherein said cascading fluid flow reverser is supported by said sleeve at a forward end of the translating wall section.

18. The thrust reverser as set forth in claim 16, wherein a ratio of said first distance between said forward reverser edge and said aft reverser edge to said second distance between said forward aperture edge and said aft aperture edge is within the range of from $1/8$ to $7/8$.

19. The thrust reverser as set forth in claim 16, wherein a ratio of said first distance between said forward reverser edge and said aft reverser edge to said second distance between said forward aperture edge and said aft aperture edge is within the range of from $3/8$ to $5/8$.

20. A method of reversing the thrust of a jet engine, the method comprising:
- moving a translating wall section from a first wall position adjacent a fixed portion of said jet engine to a second wall position separated from said fixed portion by a space thereby creating an aperture between said translating wall section and said fixed portion;
- moving a blocker door from a first door position to a second door position, wherein said blocker door impedes an internal fluid stream through said jet engine when in said second door position thereby directing said fluid stream through said aperture; and
- placing a fluid flow reverser element such that said fluid flow reverser element engages a first portion of fluid of said fluid stream and directs said first portion of fluid in a direction generally forward relative to said jet engine and such that a second portion of fluid of said fluid stream does not engage the fluid flow reverser element and is entrained within the first portion of the fluid stream.

* * * * *